(12) United States Patent
Nishimura

(10) Patent No.: US 6,543,696 B2
(45) Date of Patent: Apr. 8, 2003

(54) PORTABLE INFORMATION TERMINAL

(75) Inventor: Hiroyuki Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/852,760

(22) Filed: May 11, 2001

(65) Prior Publication Data

US 2001/0032883 A1 Oct. 25, 2001

Related U.S. Application Data

(63) Continuation of application No. PCT/JP99/05883, filed on Oct. 25, 1999.

(51) Int. Cl.$^7$ ................................................. G06K 7/10
(52) U.S. Cl. .................. 235/472.01; 235/486; 235/492; 235/380; 235/441; 235/449
(58) Field of Search ..................... 235/472.01, 492, 235/449, 441, 380, 486

(56) References Cited

U.S. PATENT DOCUMENTS

| | | | | |
|---|---|---|---|---|
| 5,257,414 A | * | 10/1993 | Trahan et al. | 235/441 X |
| 5,420,759 A | * | 5/1995 | Charlier et al. | 361/814 |
| 5,436,969 A | * | 7/1995 | Kobayashi | 379/433 |
| 5,586,890 A | * | 12/1996 | Braun | 439/66 |
| 5,604,787 A | * | 2/1997 | Kotzin et al. | 379/58 |
| 5,615,260 A | * | 3/1997 | Kurgan | 379/433 |
| 5,651,068 A | * | 7/1997 | Klemba et al. | 235/380 X |
| 5,699,406 A | * | 12/1997 | Liikanen et al. | 379/58 |
| 5,883,786 A | * | 3/1999 | Nixon | 361/737 |
| 5,894,597 A | * | 4/1999 | Schwartz et al. | 455/558 |
| 5,902,991 A | * | 5/1999 | Kumar | 235/492 |
| 6,059,592 A | * | 5/2000 | Inadama | 439/188 |
| 6,244,894 B1 | * | 6/2001 | Miyashita | 439/500 |
| 6,454,574 B1 | * | 9/2002 | Yu | 439/637 |

FOREIGN PATENT DOCUMENTS

| | | |
|---|---|---|
| EP | 0 616 458 B | 9/1994 |
| JP | 1-96070 | 6/1989 |
| JP | 1-304998 A | 12/1989 |
| JP | 6-276263 A | 9/1994 |
| JP | 10-190803 A | 7/1998 |
| JP | 2000-206983 A | * 6/2000 |

\* cited by examiner

Primary Examiner—Karl D. Frech
Assistant Examiner—David Walsh
(74) Attorney, Agent, or Firm—Rothwell, Figg, Ernst & Manbeck

(57) ABSTRACT

A portable information terminal of the present invention is used with an IC card 10, the portable information terminal includes a housing forming the portable information terminal main body, a circuit board 20 disposed in the housing, and a connector 18 which is provided with a plurality of connection terminals 19 connected to the circuit board 20 and which is formed to define a groove for storing an information card 10. The plurality of connection terminals 19 are arranged on a lateral wall of the connector 18 in such a manner that the connection terminals 19 contact with a plurality of connection terminals of the information card 10. The connection terminals 19 are disposed on a plane which is inclined with respect to a main plane of the circuit board 20.

10 Claims, 11 Drawing Sheets

PORTABLE INFORMATION TERMINAL

CROSS-REFERENCE TO THE RELATED APPLICATION

This application is a continuation of International Application No. PCT/JP99/05883, whose International filing date is Oct. 25, 1999, the disclosures of which Application are incorporated by reference herein. The present application has not been published in English.

BACKGROUND OF THE INVENTION

1. Field of the Invention

The present invention relates to a portable information terminal such as a portable telephone which is used with an IC card in which individual identification information or the like is recorded.

2. Description of the Related Art

In Europe, an IC card which records individual identification information or the like for identifying an individual user, which is called an SIM (Subscriber Identity Module) card, is used in a GSM (Global System for Mobile Communication) which is a communication system for a portable telephone. In Japan, the development of portable information terminals using IC cards is under consideration.

A connector and a circuit board are provided in a main body of a portable information terminal in order to load an IC card. FIG. 1, FIG. 2 and FIG. 3 are perspective views showing the structure of a conventional portable telephone.

In FIG. 1, reference numeral 1 denotes a front case of a portable information terminal such as a portable telephone, 2 is a rear case, and 3 is a battery pack mounted detachably in a rear section of the rear case 2. 4 is a knob lock provided on an upper step end of the rear section of the rear case 2. 5 is an earphone terminal which is provided on a lateral side of the rear case 2. 6 is an external interface connector which is provided on a bottom section of the rear case 2. 7 is an antenna which is shown in a state of being housed in the rear case 2. 8 is a flip cover, one end of which is mounted pivotally on the front case 1 by a hinge (not shown). 9 is a connector which is formed in a central portion of a lower step of the rear section of the rear case 2 as a concave portion towards the front surface of the portable information terminal. 10 is an IC card which can be connected with the connector 9.

Next, the operation in use of the portable information terminal as shown in FIG. 1 will be described. An IC card 10 is inserted in a concave portion of the connector 9, thereafter, a battery pack 3 is attached to a rear case 2 so as to cover the IC card 10. The portable information terminal can be used in a state that the battery pack 3 is attached to the rear case 2.

In FIG. 2, components, which are the same as those represented in FIG. 1 are indicated by the same reference numerals and additional description will be omitted. Reference numeral 11 denotes a connector which has an insertion mouth on a step end face of the rear case 2 and which is adapted to define, a groove, into which the IC card is loaded, extending towards the upper face of the rear case 2 from the above end face.

The operation of using the portable information terminal as shown in FIG. 2 will be described below. After an IC card 10 is loaded into the groove of the connector 11, a battery pack 3 is attached to a rear case 2 so as to cover the insertion mouth of the groove. The portable information terminal can be used in a condition that the battery pack 3 is attached to the rear case 2.

In FIG. 3, components which are the same as those represented in FIG. 1 are indicated by the same reference numerals and additional description will be omitted. Reference numeral 12 denotes an operation key which is used for specific purposes and which is provided at a distance from the cover 8 on a front face of the front case 1. 13 is a display panel which is provided on an upper section of the front face of the front case 1. 14 is a signal reception lamp which is provided on an upper end of the front face of the front case 1 and indicates signal reception by a blinking signal with a signal is received. 15 is a receiver which is provided near the upper end of the front face of the front case 1. 16 is a microphone which is provided near a lower end of the front face of the front case 1. 17 is a connector which has an insertion mouth in an upper portion on one of side faces of the front case 1 and which is adapted to define a groove extending towards the other side face of the front case 1. In the portable information terminal as shown in FIG. 3, since there is a possibility of damaging the circuit elements or losing the IC card as a result of the IC card being dislodged from the groove by an impact caused by dropping the portable information terminal main body or the like, a detachable cap is provided on the insertion mouth of the connector 17 although this is not shown in FIG. 3. A power source disconnecting circuit and a switching mechanism for disconnecting power supply if the IC card is dislodged are also provided.

Since the conventional portable information terminal is constructed as above, the connection terminal of the connector which is connected with the connection terminal of the IC card is arranged in a direction parallel to the main plane (the plane which is defined based on the face of the circuit board on which the majority of the circuit elements are mounted) of the circuit board stored in the portable information terminal main body. Thus, the problem has arisen that the occupied area of the circuit board by the connector or the connector-related elements is increased and it is difficult to downsize the portable information terminal.

Furthermore, in the conventional portable information terminal; the structure required for the mechanism to remove the IC card stored in a groove or a concave portion becomes complicated. Thus, the problem has arisen that it is difficult to reduce costs and reduce the weight of the portable information terminal.

SUMMARY OF THE INVENTION

The present invention is proposed to solve the above problems and has the object of providing a portable information terminal provided with a connector which can reduce the occupied area of the circuit board by a connector or connector-related elements in a portable information terminal main body.

The present invention has a further object of providing a portable information terminal provided with a connector which has a simple structure.

According to the present invention, there is provided a portable information terminal comprising a housing forming a portable information terminal main body, a circuit board provided in the housing, and a connector which has a plurality of connection terminals to be connected to the circuit board and which is formed so as to define a groove for storing an information card, the plurality of connection terminals being arranged on a lateral wall of the connector so as to contact with a plurality of connection terminals provided in the information card, and the plurality of connection terminals of the connector being disposed on a plane which is inclined with respect to the main plane of the circuit board.

In such a way, since the projected area of the connector onto the circuit board is reduced, the occupied area of the circuit board by the connector or the connector-related elements can be reduced.

Further, according to the present invention, there is provided a portable information terminal comprising a housing forming a portable information terminal main body, a circuit board provided in the housing, and an information card electrically connected with the circuit board, wherein when the information card is attached in the housing so as to be electrically connected with the circuit board, the information card is disposed on a plane inclined with respect to a main plane of the circuit board.

In such a way, since the connector to which the information card is attached is also disposed inclined with respect to the main plane of the circuit board, the projected area of the connector onto the circuit board is reduced. Thus, the occupied area of the circuit board by the connector or the connector related elements can be reduced.

The portable information terminal of the present invention may be adapted so that the plurality of connection terminals which are connected with the plurality of connection terminals provided in the information card are arranged on both a lateral walls of the connector which loads the information card.

In this way, it is possible to load an information card without reference to the rear surface of the information card.

In the portable information terminal of the present invention, the groove may have an insertion mouth formed on a surface of the housing, a length of which is greater than or equal to a width of the information card, and the groove may have a height less than a height of the information card.

In such a way, when an information card is loaded in the groove of the connector, an upper part of the information card protrudes outward from the connector. Thus, the information card can be easily withdrawn by grasping a protruding part of the information card with a forefinger and thumb. Therefore, since the connector does not require a complicated mechanism, the structure of the connector can be simplified.

In the portable information terminal of the present invention, the groove may include an insertion section having an insertion mouth formed on a surface of the housing and a mounting section having a guide mouth surrounded by a U-shaped wall portion, the insertion mouth having a length greater than or equal to a width of the information card, the guide mouth having a length not less than a height of the information card, and the mounting section being in communication with the insertion section at the guide mouth.

In such a way, when an information card is loaded in the mounting section, the information card can not be removed from the connector without a two-step movement. Thus, the effect is obtained that it is possible to prevent the information card from being dislodged by an impact generated for example when the portable information terminal is dropped.

Further, in the portable information terminal of the present invention, the insertion section may have a height less than the height of the information card and the mounting section may have a depth of a length less than the width of the information card.

In such a way, when an information card is loaded in the mounting section of the connector, a part of the information card protrudes outward from the connector. Thus, the information card can be easily removed from the connector by grasping a protruding part of the information card with a forefinger and thumb. Therefore, since a complicated mechanism is required for the connector, the structure of the connector can be simplified.

Furthermore, in the portable information terminal of the present invention, the insertion mouth may be formed along a lateral direction or a longitudinal direction of the portable information terminal main body.

In such a way, since the connector is also arranged along the lateral direction or the longitudinal direction of the portable information terminal main body, the connector can be arranged in such a manner that a portion of the circuit board occupied by the connector or connector-related elements has its boundary which is parallel or orthogonal to the wiring on the circuit board. Thus, it is possible to effectively utilize the board surface of the circuit board, thereby to downsize the circuit board.

The portable information terminal of the present invention may further comprise a battery pack which is attached to the housing so as to cover the information card stored in the groove.

In such a way, since the battery pack must be removed prior to detachment of the information card, the information card can be attached or detached constantly in a state of being disconnected from the power source. Thus, it is possible to prevent damage to the elements.

The portable information terminal of the present invention may further comprises a flip which is attached to open or close freely with respect to the housing and which is adapted to cover the connector when the flip is closed.

In such a way, since it is possible to attach the information card to the connector by only opening the flip, the operation of attaching the information card can be facilitated.

The portable information terminal of the present invention may further comprise a detection switch for detecting the presence of the information card, the detection switch including a first switching member and a second switching member which are disposed in the groove, the first switching member being in contact with the second switching member when the information card is stored in a loaded position, and the first and second switching members being separated from each other when the information card is displaced from the loaded position.

In such a way, when the connection terminals of the connector are connected with the connection terminals of the information card or when the contact of the connection terminals of the information card with the connection terminals of the connector is released, the information card is always disconnected from the power source. Thus, it is possible to prevent damage to the elements even when the information card is inadvertently detached from the connector.

DETAILED DESCRIPTION OF THE PREFERRED EMBODIMENTS

In order to describe the present invention in more detail, the best mode for carrying out the invention will be described with reference to the accompanying drawings.
Embodiment 1

Figure 1:
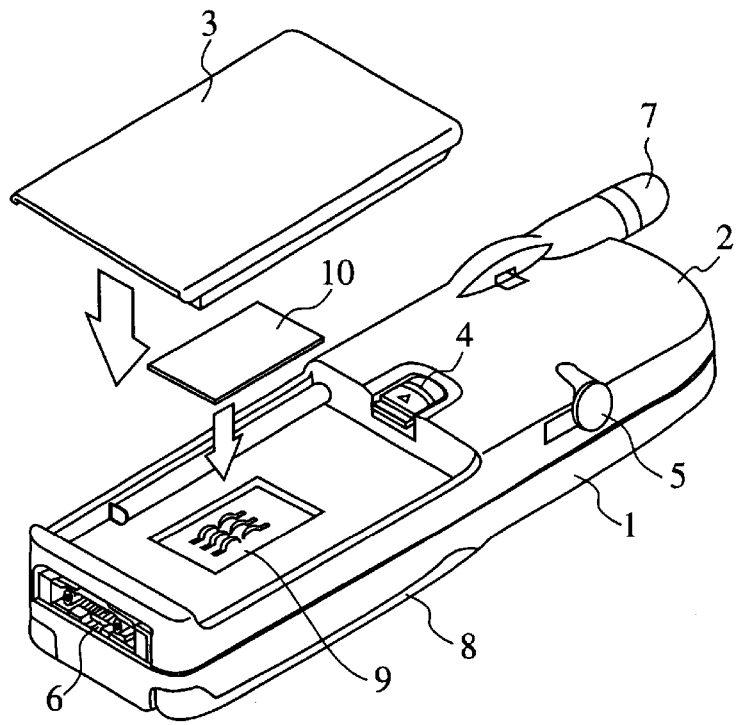
FIG. 1 a perspective view showing the structure of a conventional portable telephone.
Figure 2:
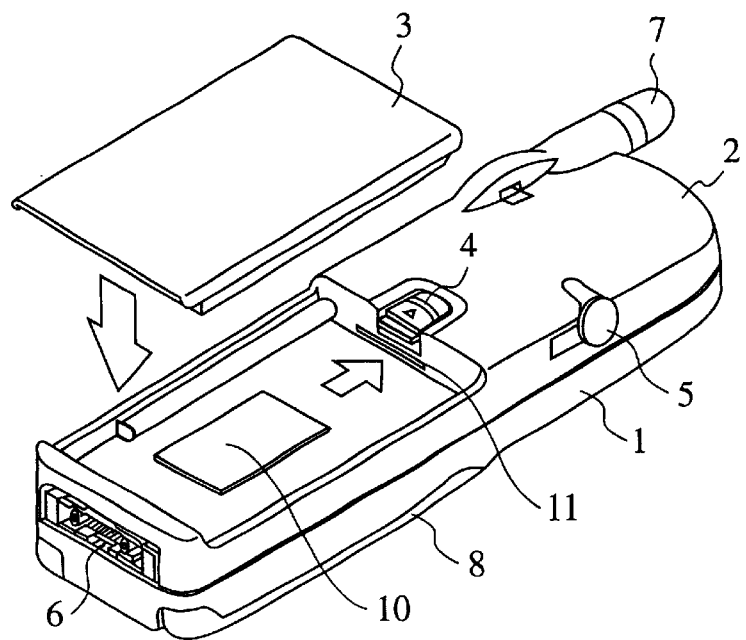
FIG. 2 is a perspective view showing the structure of a conventional portable telephone.
Figure 4:
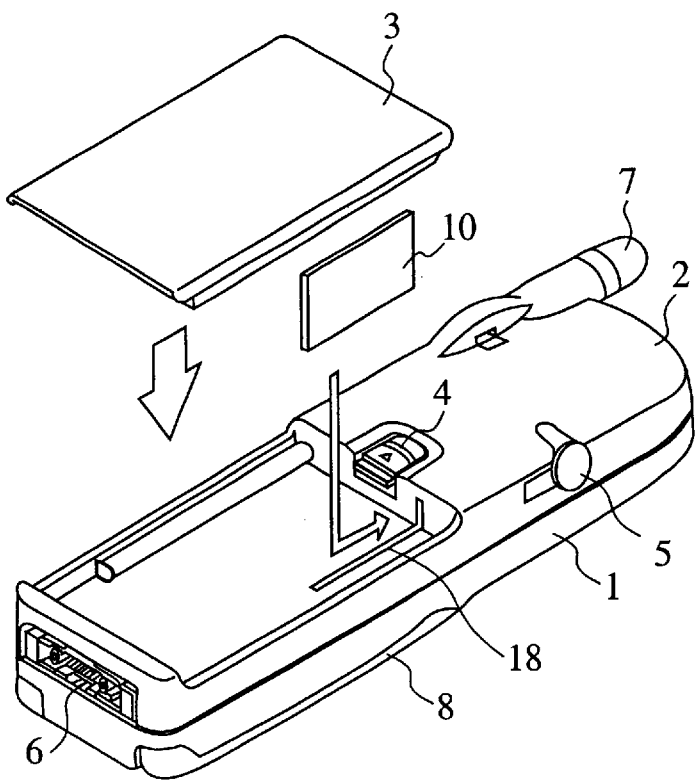
FIG. 4 is an exploded perspective view showing the structure of a portable information terminal according to a first embodiment of the present invention.

FIG. 4 is an exploded perspective view showing the structure of a portable information terminal according to a first embodiment of the present invention. In FIG. 4, components which are the same or similar to those described in FIG. 1 are designated by the same reference numerals and the additional description will be omitted. Reference numeral 18 denotes a connector adapted to define a groove for storing an IC card, which extends in a perpendicular direction with respect to the main plane (this plane being defined on the basis of the surface of the circuit board on which the majority of the circuit elements are mounted) of the circuit board disposed in the portable information terminal main body and which is formed along a longitudinal direction of the portable information terminal main body. The groove of the connector 18 has an insertion section which is provided with an insertion mouth having a length greater than or equal to a width of the IC card (information card) 10, the insertion mouth is formed on a lower step in the rear of the rear case 2. The insertion section has a height less than the height of the IC card 10 and extends from the insertion mouth towards a front surface. The groove also has a mounting section which is provided with a guide mouth having a length greater than or equal to the height of the IC card 10 and which is surrounded by a U-shaped wall. The mounting section communicates with the insertion section at the guide mouth and extends towards an upper surface of the rear case 2. The mounting section has a length less than the width of the IC card 10. Furthermore, the housing that is a portable information terminal main body consists of a front case 1 and a rear case 2.

Figure 3:
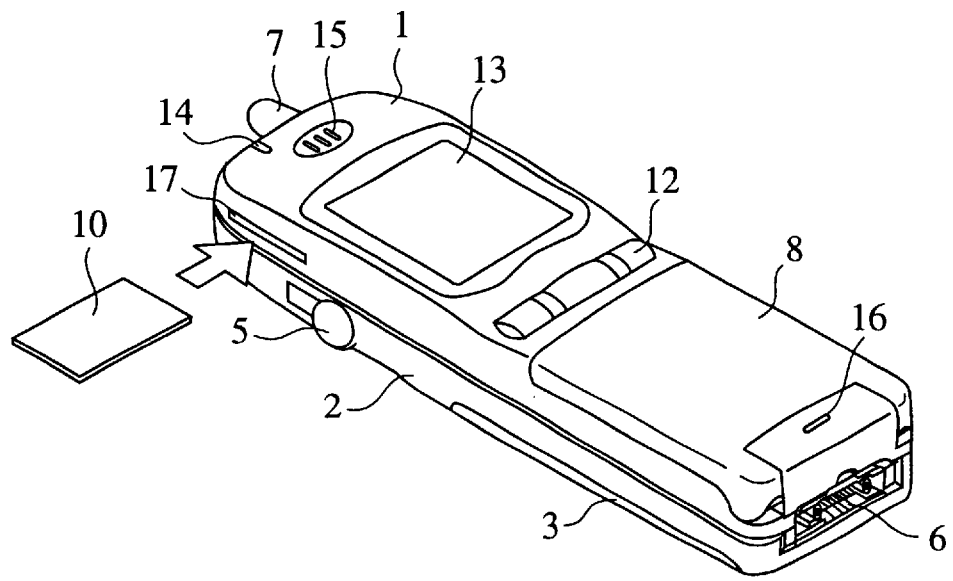
FIG. 3 is a perspective view showing the structure of a conventional portable telephone.
Figure 5:
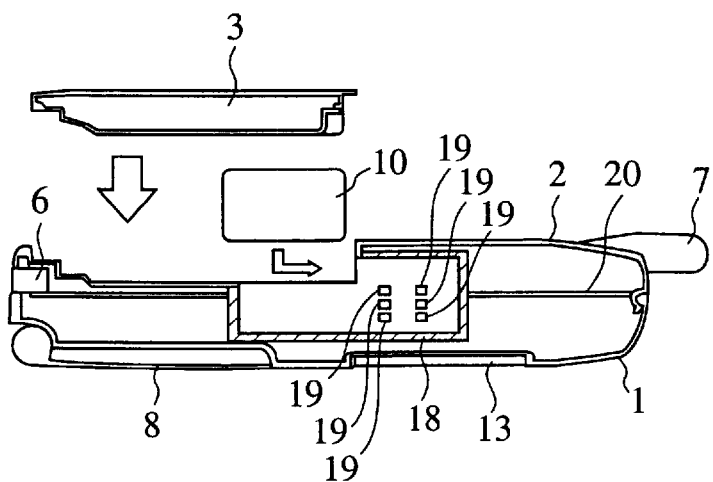
FIG. 5 is a longitudinal cross sectional view showing the structure of the portable information terminal according to the first embodiment of the present invention.
Figure 6:
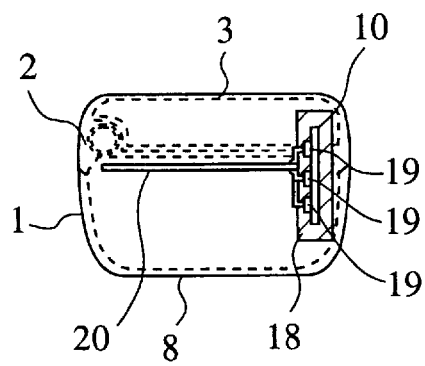
FIG. 6 is a lateral cross sectional view showing the structure of the portable information terminal according to the first embodiment of the present invention.
Figure 7:
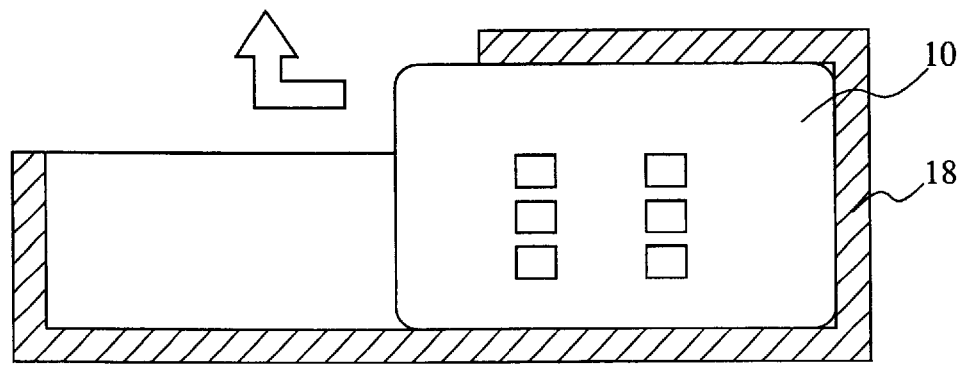
FIG. 7 is a longitudinal cross sectional view of a connector to which an IC card is attached.

FIG. 5 is a longitudinal cross sectional view showing the structure of the portable information terminal according to the first embodiment of the present invention. FIG. 6 is a lateral cross sectional view showing the structure of the portable information terminal according to the first embodiment of the present invention. FIG. 7 is a longitudinal cross sectional view of the connector to which an IC card is attached. In FIG. 5, FIG. 6 and FIG. 7, components which are the same or similar to those described in FIG. 3 or FIG. 4 are designated by the same reference numerals and the additional description will be omitted.

In FIG. 5 and FIG. 6, reference numeral 19 denotes connection terminals for the connector 18, the connection terminals 19 are arranged in a perpendicular direction with respect to the main plane of the circuit board provided in the portable information terminal main body. The connection terminals is adapted to contact with connection terminals of an IC card 10 arranged in the same way when the IC card 10 is attached to the connector 18. Further, 20 is a circuit board which is provided in the portable information terminal main body.

The operation of the portable information terminal will be described below.

When the portable information terminal is used, an IC card 10 is inserted downwardly through the insertion mouth provided in the insertion section of the connector 18 and the IC card is stored in the insertion section. Next, the IC card 10 is displaced from the insertion section through the-guide mouth towards the mounting section, in which the connection terminals 19 are disposed, in order to load the IC card 10 in the mounting section. As a result, the connection terminals of the IC card 10 are respectively contacted with the connection terminals of the connector 18. When the IC card 10 is loaded in the mounting section of the connector 18, as shown in FIG. 7, a part near a corner of the IC card 10, which is formed in a rectangular shape, protrudes outside from the connector 18. Then, a battery pack 3 is attached to cover the protruding part of the IC card 10.

When use of the portable information terminal is completed and the IC card is withdrawn, the battery pack 3 is detached, and thereafter, the protruding part of the IC card 10 is grasped and displaced so that the IC card 10 is withdrawn from the mounting section of the connector 18 into the insertion section. Thereafter, the IC card is drawn upwardly by grasping a part which protrudes from the insertion mouth provided in the insertion section of the connector 18.

As shown above, according to the first embodiment of the present invention, since a connector 18 is adapted to have a groove extending in a perpendicular direction with respect to a main plane of a circuit board which is provided in a portable information terminal main body, it is possible to reduce the occupied area of the circuit board by the connector or the connector-related elements.

Since the groove of the connector 18 has an insertion section for inserting the IC card 10 and a mounting section surrounded by a U-shaped wall which ensures contact of the connection terminals of the connector with those of the IC card attached, it is not possible to withdraw the IC card 10 to the exterior without a two-step movement. Thus, the effect is obtained that it is possible to prevent the IC card 10 from being detached from the connector by an impact generated from example when the portable information terminal is dropped.

Since the portable information terminal has a battery pack 3 which is attached after loading the IC card 10, the IC card 10 can be attached or detached constantly in a state where the power supply is cut. Thus, it is possible to prevent damage to the elements.

Furthermore, the insertion section of the groove has a height less than a height of the IC card 10 and the mounting section has a depth the length of which is less than a width of the IC card 10. Thus, when the IC card is loaded in the mounting section, a part of the IC card protrudes from the connector 18 to the exterior. Therefore, after the battery pack 3 is detached, it is possible to easily remove the IC card 10 only by grasping and withdrawing the protruding part of the IC card 10 with the thumb and forefinger. As a result thereof, it is possible to simplify the structure of a connector without the complicated mechanism.

Embodiment 2

Figure 8:
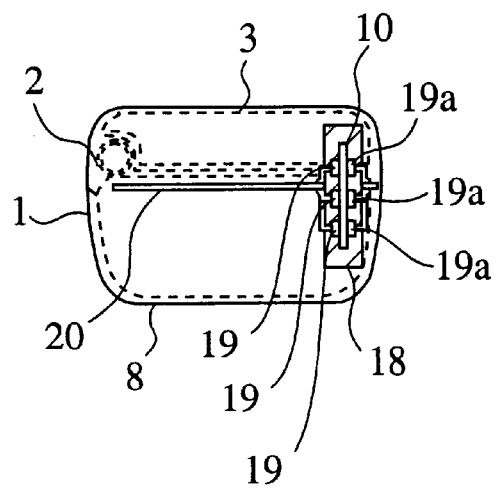
FIG. 8 is a lateral cross sectional view showing the structure of a portable information terminal according to a second embodiment of the present invention.

FIG. 8 is a lateral cross sectional view showing the structure of a portable information terminal according to a second embodiment of the present invention. In FIG. 8, components which are the same as or similar to those described in FIG. 6 are designated by the same reference numerals and the additional description will be omitted. In comparison with the first embodiment, the point of difference in the second embodiment is that the connection terminals are arranged on both side walls of the connector 18. In the figure, reference numeral 19a denotes connection terminals of a connector 18 which are arranged on a side wall facing an another side wall on which the connection terminals 19 of the connector 18 are disposed.

Next, the operation of the portable information terminal will be described.

Firstly, an IC card 10 is inserted downwardly through the insertion mouth provided in the insertion section of the connector 18, thereby to place the IC card in the insertion section. Next, the IC card 10 is displaced from the insertion section through the guide mouth towards the mounting section in which the connection terminals 19 and 19a are provided and is loaded in the mounting section. As a result, the connection terminals of the IC card 10 are respectively contacted with the connection terminals 19 or the connection terminals 19a of the connector 18. Then, a battery pack 3 is attached to cover the protruded part of the IC card 10. When the use of the portable information terminal is completed, the removal operation of the IC card is the same as that in the first embodiment and thus the additional description will be omitted.

As described above, according to the second embodiment, the same effects are obtained as the first embodiment. In addition, since the portable information terminal has a plurality of connection terminals which are disposed on both side walls of the connector 18, it is possible to load an IC card without reference to the rear surface of the IC card 10.

Embodiment 3

Figure 9:
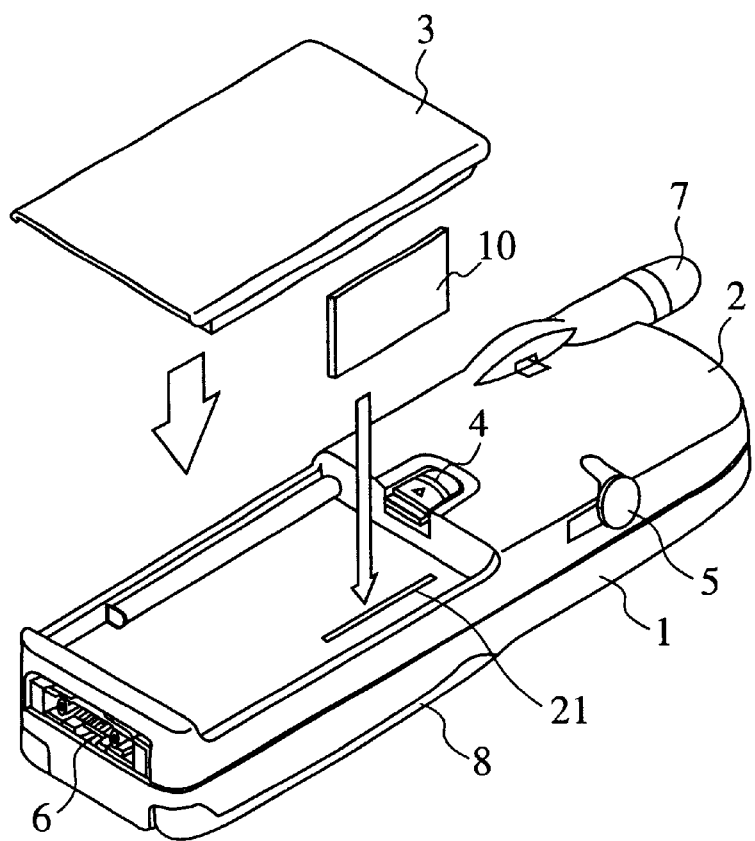
FIG. 9 is an exploded perspective view showing the structure of a portable information terminal according to a third embodiment of the present invention.

FIG. 9 is an exploded perspective view showing the structure of a portable information terminal according to a third embodiment of the present invention. In FIG. 9, components which are the same as or similar to those described in FIG. 1 are designated by the same reference numerals and additional description will be omitted. 21 is a connector including the groove which extends in a perpendicular direction with respect to the main plane of the circuit board provided in the portable information terminal main body and which is formed along a longitudinal direction of the portable information terminal main body. The groove of the connector 21 includes an insertion mouth which is provided on a lower step of the rear case 2 and which has a length greater than or equal to the width of the IC card 10. The groove extends from the insertion mouth towards the front surface and has a height less than a height of the IC card 10.

Figure 10:
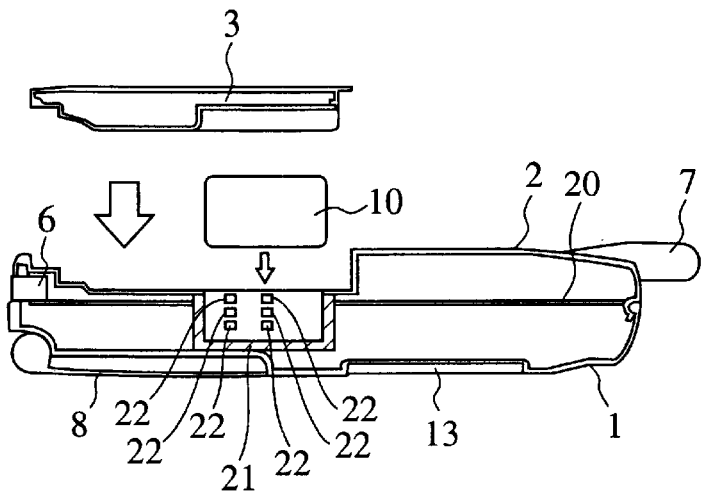
FIG. 10 is a longitudinal cross sectional view showing the structure of the portable information terminal according to the third embodiment of the present invention.
Figure 11:
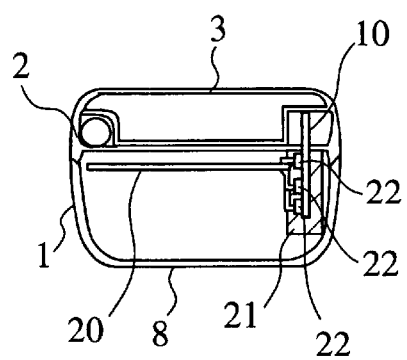
FIG. 11 is a lateral cross sectional view showing the structure of the portable information terminal according to the third embodiment of the present invention.
Figure 12:
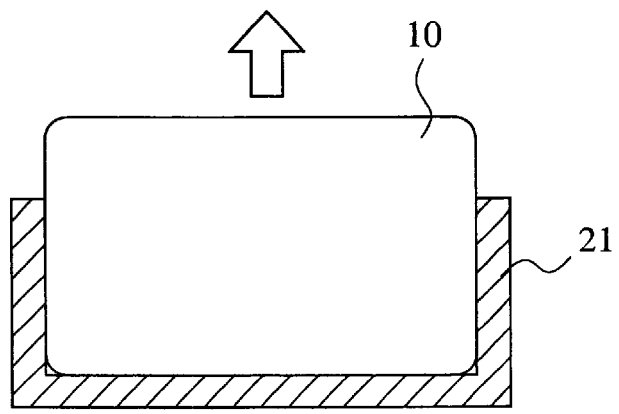
FIG. 12 is a longitudinal cross sectional view of a connector to which an IC card is attached.

FIG. 10 is a longitudinal cross sectional view showing the structure of the portable information terminal according to the third embodiment of the present invention. FIG. 11 is a lateral cross sectional view showing the structure of the portable information terminal according to the third embodiment of the present invention. FIG. 12 is a longitudinal cross sectional view of a connector to which an IC card is attached. In FIG. 10, FIG. 11 and FIG. 12, components which are the same as or similar to those described in FIG. 5 and FIG. 9 are designated by the same reference numerals and additional description will be omitted.

In FIG. 10 and FIG. 11, reference numeral 22 denotes connection terminals of the connector 21. The connection terminals 22 are arranged in a perpendicular direction with respect to the main plane of the circuit board 20 which is provided in the portable information terminal main body, and the connection terminals are adapted to contact with the respective connection terminals of the IC card 10, which are arranged in a same way, when the IC card 10 is attached.

The operation of the portable information terminal will be described below.

Firstly, when a portable information terminal is used, an IC card 10 is inserted downwardly through the insertion mouth of the connector 21, and the connection terminals of the IC card 10 contact with the respective connection terminals of the connector 18. When the IC card 10 is loaded in the connector 21, as shown in FIG. 12, an upper part of the IC card 10 which is formed in a rectangular shape protrudes from the connector 21. A battery pack 3 is attached to cover the protruded part of the IC card 10.

When the use of the portable information terminal is completed and the IC card is removed, the IC card 10 is drawn upwardly from the connector 21 by grasping the protruded part of the IC card 10 after the removal of the battery pack 3.

As described above, according to the third embodiment, since the connector 21 has a groove which extends in a perpendicular direction with respect to the main plane of the circuit board provided in the portable information terminal main body, it is possible to reduce an occupied area of the circuit board by the connector or the connector-related elements.

Further, since a battery pack 3 is attached after loading the IC card 10, the IC card 10 can be attached or detached constantly in a state where the power supply is cut. Thus, it is possible to prevent damage to the respective elements.

In addition, since the groove of the connector 21 has a height less than a height of the IC card 10, an upper part of the IC card, which is loaded in the connector 21, protrudes from the connector 21. Thus, after the battery pack 3 is detached, it is possible to easily remove the IC card 10 by grasping the protruded part of the IC card 10 with the thumb and forefinger and withdrawing it. Therefore, it is possible to simplify the structure of a connector 21, without requiring a complicated mechanism.

Embodiment 4

Figure 13:
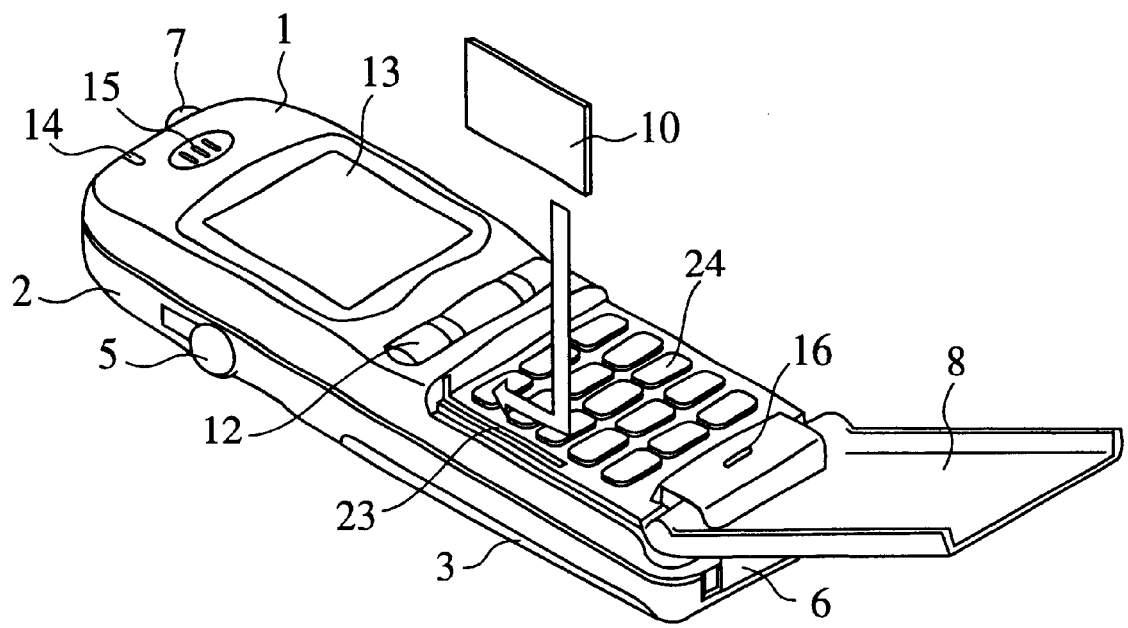
FIG. 13 is a perspective view showing the structure of a portable information terminal according to a fourth embodiment of the present invention.

FIG. 13 is a perspective view showing the structure of a portable information terminal according to a fourth embodiment of the present invention. In FIG. 13, components which are the same as or similar to those described in FIG. 1 and FIG. 3 are designated by the same reference numerals and additional description will be omitted. In the figure, reference numeral 23 denotes a connector with a groove which extends in a perpendicular direction with respect to the main plane of the circuit board provided in the portable information terminal main body and which is provided along a longitudinal direction of the portable information terminal main body. The groove of the connector 23 has an insertion section, which includes an insertion mouth having a length greater than or equal to a width of the IC card 10. The insertion mouth is formed on a lower step in the front section of the front case 1 in which the flip cover 8 is opened. The insertion section has a height less than that of the IC card 10 and extends in a direction of the rear surface from the insertion mouth. The groove also has a mounting section, which includes a guiding mouth having a length greater than or equal to a height of the IC card 10. The guide mouth is surrounded by a U-shaped wall. The mounting section communicates with the insertion section at the guide mouth and extends towards the upper surface of the front case 1. The depth of the mounting section has a length less than a width of the IC card 10. 24 is a dial key which is arranged on the lower step in the front section of the front case 1 which is opened by the flip cover 8.

Figure 14:
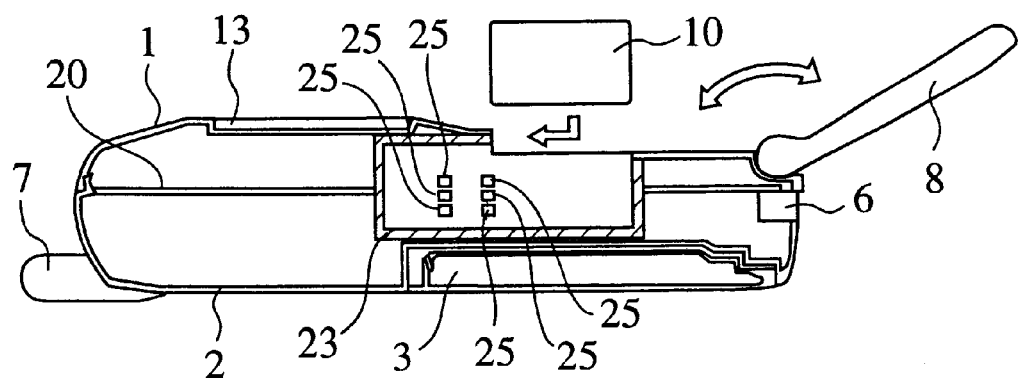
FIG. 14 longitudinal cross sectional view showing the structure of the portable information terminal according to the fourth embodiment of the present invention.
Figure 15:
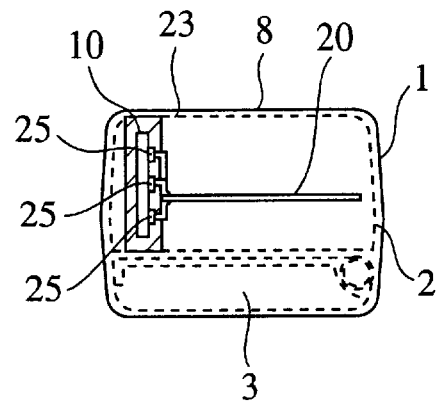
FIG. 15 is a lateral cross sectional view showing the structure of the portable information terminal according to the fourth embodiment of the present invention.
Figure 16:
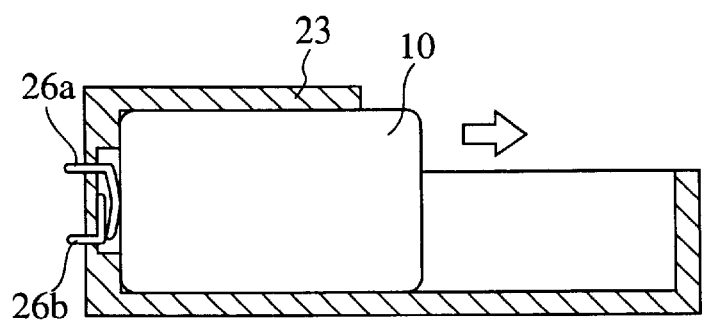
FIG. 16 is a longitudinal cross sectional view of a connector to which an IC card is attached.
Figure 17:
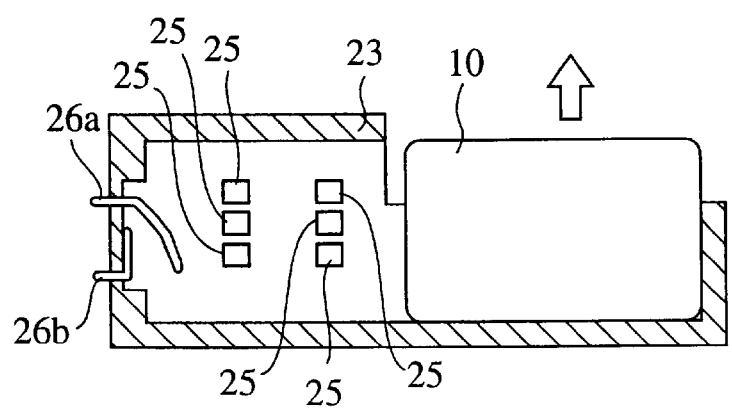
FIG. 17 is a longitudinal cross sectional view of a connector in the process of removing IC card.

FIG. 14 is a longitudinal cross sectional view showing the structure of the portable information terminal according to the fourth embodiment of the present invention. FIG. 15 is a lateral cross sectional view of the structure of the portable information terminal according to the fourth embodiment of the present invention. FIG. 16, is a longitudinal cross sectional view of a connector to which an IC card is attached. FIG. 17 is a longitudinal cross sectional view showing the connector in the process of removing the IC card. In FIG. 14, FIG. 15 FIG. 16 and FIG. 17, components which are the same as or similar to those described in FIG. 5 and FIG. 13 are designated by the same reference numerals and additional description will be omitted.

In FIG. 14 and FIG. 15, reference numeral 25 denotes connection terminals of the connector 23 which is arranged in a direction perpendicular to the main plane of the circuit board 20 which is provided in the portable information terminal main body. Further, the connection terminals 25 are adapted to contact with the respective connection terminals of an IC card 10 which is arranged in a same way, when the IC card 10 is attached to the connector 23.

In FIG. 16, reference numerals 26a, 26b each denotes a switch member disposed in a concave portion which is formed in a bottom section of the U-shaped wall surrounding the mounting section of the connector 23. The switch members 26a, 26b constitute a detection switch. As shown in FIG. 16, when an IC card 10 is loaded in the mounting section of the connector 23, the switch member 26a (first switch member) and the switch member 26b (second switch member) come into contact. On the other hand, as shown in FIG. 17, when the IC card 10 is withdrawn from the mounting section of the connector 23, the switch member 26a and the switch member 26b are separated from each other.

The operation of the portable information terminal will be described below.

Firstly, when the portable information terminal is used, the flip 8 is opened, an IC card 10 is inserted downwards through the insertion mouth provided in the insertion section of the connector 23 and stored in the insertion section. Next, the IC card 10 is displaced from the insertion section through the guide mouth to the mounting section in which the connection terminals 25 is provided, and is stored in the mounting section. Thus, the connection terminals of the connector 23 and the connection terminals of the IC card 10 respectively make contact. At this time, the switch member 26a is pressed by the IC card 10 and contacts with the switch member 26b, and thus power is switched ON. As shown in FIG. 16, an IC card 10 is formed in a rectangular shape, a part near a corner of the IC card 10 protrudes outside from the connector 23. After the loading of the IC card 10 in the connector 23 is completed, the flip 8 is closed.

When the use of the portable information terminal is completed and the IC card is removed, firstly the flip 8 is opened, and then, the IC card 10 is withdrawn from the mounting section to the insertion section of the connector 23 by grasping the protruded part of the IC card 10 and sliding the IC card 10. At this time, the switch member 26a is separated from the switch member 26b by its resilient force. As a result, before the contact of the connection terminals of the IC card 10 with the connection terminals of the connector 23 is released, the IC card 10 is cut off from the power source. Next, the IC card 10 is drawn upwardly by grasping a part of the IC card 10 protruded from the insertion mouth of the insertion section of the connector 23. Then the flip cover 8 is closed.

As described above, according to the fourth embodiment, since the connector 23 is formed to have a groove extending in a perpendicular direction with respect to the main plane of the circuit board provided in the portable information terminal main body, it is possible to reduce an occupied area on the circuit board by the connector or the connector-related elements.

Since the groove of the connector 23 is formed by an insertion section for inserting an IC card 10 and a mounting section surrounded by a U-shaped wall for ensuring the contact of the connection terminals between the connector and the IC card, it is not possible to remove the IC card to the exterior without a two-step movement. Thus, it is possible to prevent the IC card 10 from being detached from the connector by an impact generated for example when the portable information terminal is dropped.

Since the insertion section of the groove has a height less than a height of the IC card 10 and the mounting section has a depth with a length less than a width of the IC card 10, a part of the IC card 10 protrudes from the connector 23 to the exterior when the IC card 10 is loaded in the mounting section. Thus, it is possible to easily remove the IC card 10 by grasping and withdrawing the protruding part of the IC card with the thumb and forefinger after opening the flip cover 8. Therefore, it is possible to simplify the structure of a connector 23 without a complicated mechanism.

Since a first switching member 26a and a second switch member 26b are provided which comprise a detection switch for detecting the presence of an IC card 10 in the mounting section of the connector 23, the IC card 10 is always disconnected from the power source when the contact of the connection terminals of the IC card 10 and the connection terminals of the connector 23 is initiated or when the contact of the connection terminals of the IC card 10 and the connection terminals of the connector 23 is released. Thus, it is possible to prevent damage to the elements even when the information card 10 is inadvertently attached to or detached from the connector 23.

Furthermore, since a connector 23 is disposed on a front surface of the front case 1 of which a flip cover 8 is opened, it is possible to attach the IC card 10 to the connector 23 only by opening the flip cover 8 and thus an operation of attaching the IC card can be facilitated.

Embodiment 5

Figure 18:
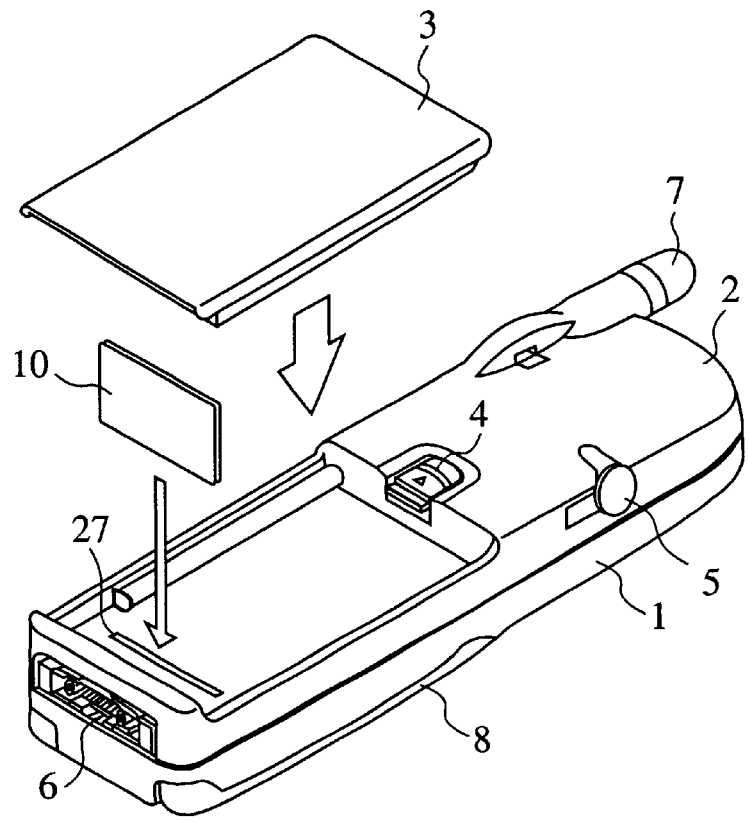
FIG. 18 an exploded perspective view showing the, structure of a portable information terminal according to a fifth embodiment of the present invention.

FIG. 18 is an exploded perspective view showing the structure of a portable information terminal according to a fifth embodiment of the present invention. In FIG. 18, components which are the same as or similar to those described in FIG. 1 are designated by the same reference numerals and additional description will be omitted. In the figure, reference numeral 27 denotes a connector adapted to define a groove which extends in a perpendicular direction with respect to the main plane of the circuit board disposed into the portable information terminal main body and which is formed along a lateral direction of the portable information terminal main body. The groove of the connector 27 is provided with an insertion mouth which is formed on a lower step in the rear section of the rear case 2 and which has a length greater than or equal to a width of the IC card 10. Further, the groove extends towards the front section from the insertion mouth and has a height less than a height of the IC card 10.

Figure 19:
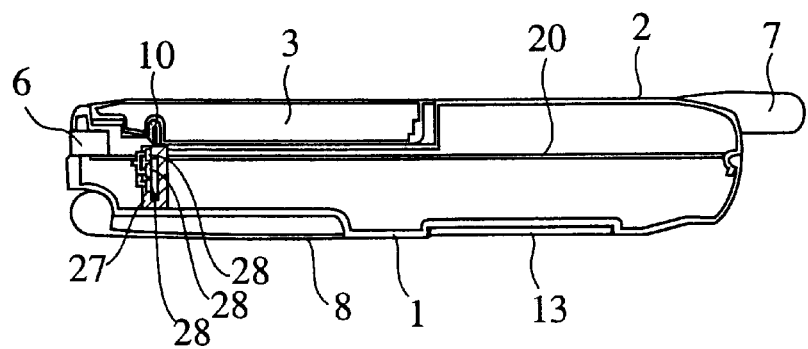
FIG. 19 is a longitudinal cross sectional view showing the structure of the portable information terminal according to the fifth embodiment of the present invention.
Figure 20:
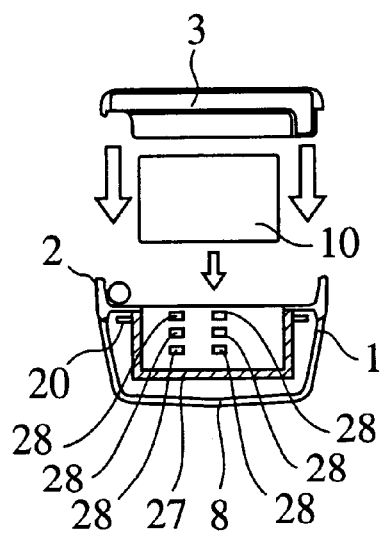
FIG. 20 is a a lateral cross sectional view showing the structure of the portable information terminal according to the fifth embodiment of the present invention.
Figure 21:
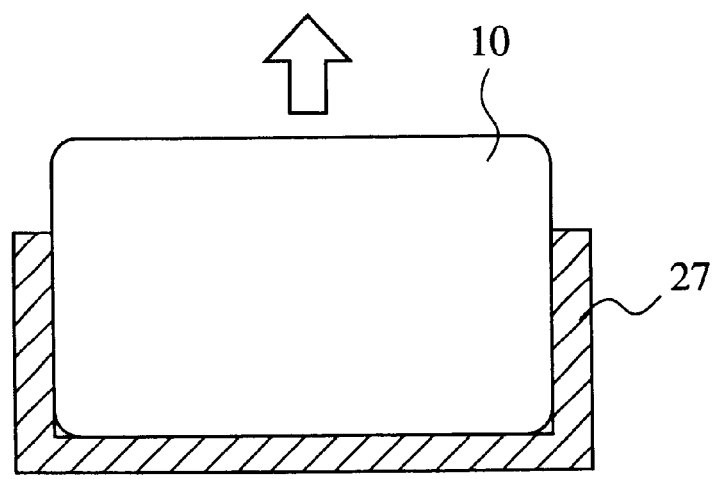
FIG. 21 is a lateral cross sectional view of a connector to which an IC card is attached.

FIG. 19 is a longitudinal cross sectional view showing the structure of the portable information terminal according to the fifth embodiment of the present invention. FIG. 20 is a lateral cross sectional view showing the structure of the portable information terminal according to the fifth embodiment of the present invention. FIG. 21 is a lateral cross sectional view of a connector to which an IC card is attached. In FIG. 19, FIG. 20 and FIG. 21, components which are the same as or similar to those described in FIG. 5 and FIG. 18 are designated by the same reference numerals and additional description will be omitted.

In FIG. 19 and FIG. 20, reference numeral 28 denotes connection terminals of the connector 27 which are arranged in a perpendicular direction to the main plane of the circuit board 20 disposed into the portable information terminal main body and which are adapted to contact with the respective connection terminals of the IC card 10 arranged in a same way when the IC card 10 is attached.

Next, the operation of the portable information terminal will be described below.

Firstly, when the portable information terminal is used, an IC card 10 is inserted downwardly from the insertion mouth of the connector 27. Thus, the connection terminals of the connector 27 and the connection terminals of the IC card 10 respectively contact. When the IC card 10 is loaded in the connector 27, as shown in FIG. 21, an upper part of the IC card 10 which is formed in a rectangular shape protrudes outside from the connector 27. Then a battery pack 3 is attached to cover the protruding part of the IC card 10.

When the use of the portable information terminal is completed and the IC card is removed, after the battery pack 3 is detached, the IC card 10 is drawn upwardly from the connector 27 by grasping the protruding part of the IC card 10.

As described above, according to the fifth embodiment, since the connector 27 is adapted to define a groove which extends in a perpendicular direction with respect to the main plane of the circuit board disposed into the portable information terminal main body, it is, possible to reduce the occupied area of the circuit board connector or the connector-related elements.

Since a battery pack 3 is attached after the loading of the IC card 10, the IC card 10 is always disconnected from the power source when the IC card 10 is attached or detached. Thus, it is possible to prevent damage to the elements.

Since the groove of the connector 27 has a height less than that of the IC card 10, the upper part of the IC card 10 attached, to the connector 27 protrudes outside from the connector 27. Thus, it is possible to easily detach the IC card 10 from the connector by grasping and withdrawing the protruding part of the IC card with the thumb and forefinger. As a result, it is possible to simplify the structure of the connector 27 without requiring a complicated mechanism.

Embodiment 6

Figure 22:
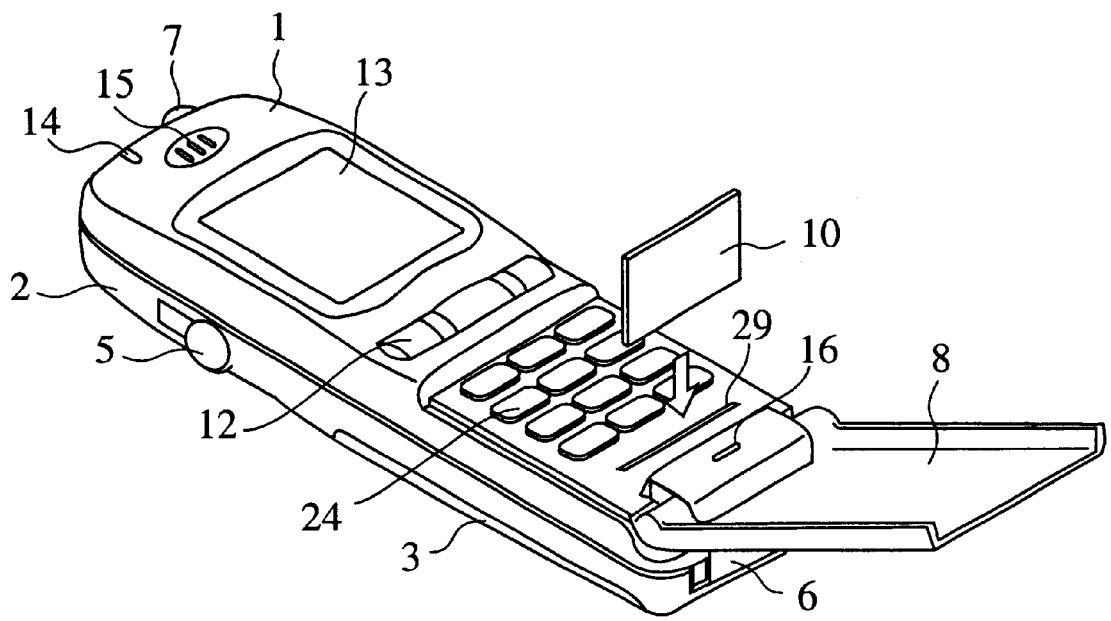
FIG. 22 is a perspective view showing the structure of a portable information terminal according to a sixth embodiment of the present invention.

FIG. 22 is a perspective view showing the structure of a portable information terminal according to a sixth embodiment of the present invention. In FIG. 22, components which are the same as or similar to those described with reference to FIG. 1, FIG. 3 and FIG. 13 are designated by the same reference numerals and additional description will be omitted. In the figure, reference numeral 29 denotes a connector adapted to define a groove which extends in a perpendicular direction with respect to the main plane of the circuit board disposed into the portable information terminal main body and which is provided along a longitudinal direction of the portable information terminal main body. The groove of the connector 29 is provided with an insertion mouth which is formed on a lower step of the front section of the front case 1, of which the flip cover 8 is opened, and which is located on a bottom side than a dial key 24. Further, the insertion mouth has a length not less than a width of the IC card 10. The groove extends from the insertion mouth towards the rear section and has a height less than that of the IC card 10.

Figure 23:
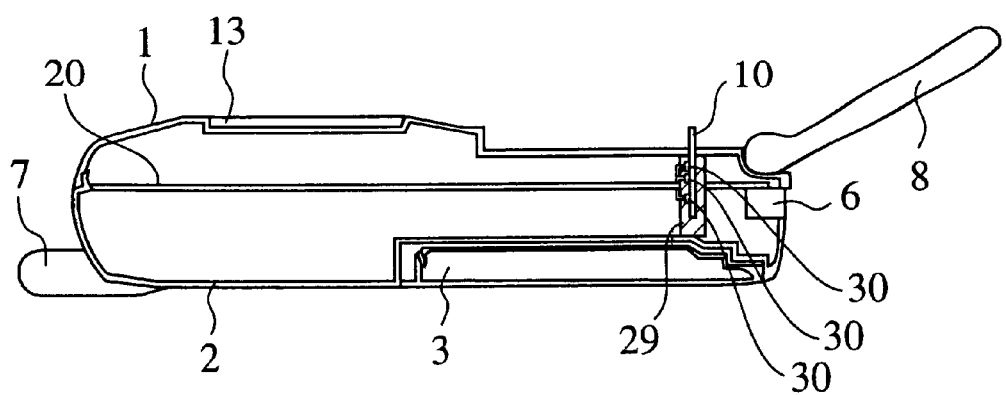
FIG. 23 a longitudinal cross sectional view showing the structure of the portable information terminal according to the sixth embodiment of the present invention.
Figure 24:
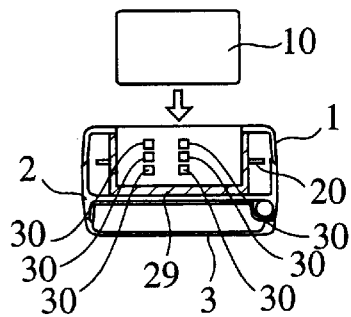
FIG. 24 is a lateral cross sectional view showing the structure of the portable information terminal according to the sixth embodiment of the present invention.
Figure 25:
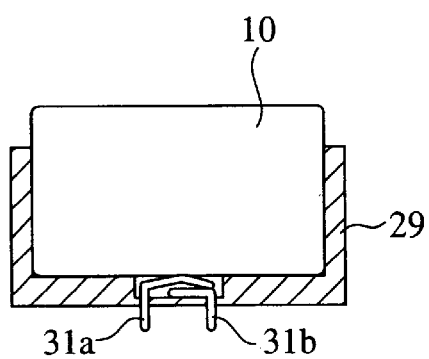
FIG. 25 is a lateral cross sectional view of a connector to which an IC card is attached.
Figure 26:
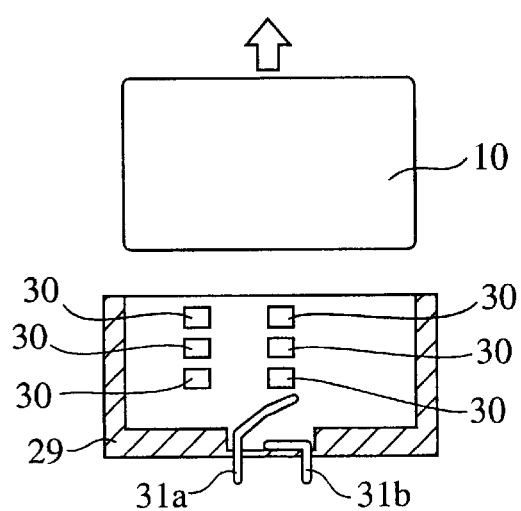
FIG. 26 is a lateral cross sectional view of a connector with an IC card removed.

FIG. 23 is a longitudinal cross sectional view showing the structure of the portable information terminal according to the sixth embodiment of the present invention. FIG. 24 is a lateral cross sectional view showing the structure of the portable information terminal according to the sixth embodiment of the present invention. FIG. 25 is a lateral cross sectional view of a connector to which an IC card is attached. FIG. 26 is a lateral cross sectional view of the connector to which the IC card is attached. In FIG. 23, FIG. 24, FIG. 25 and FIG. 26, components which are the same as or similar to those described with reference to FIG. 5 and FIG. 22, are designated by the same reference numerals and additional description will be omitted.

In FIG. 23 and FIG. 24, reference numeral 30 denotes connection terminals of the connector 29 which are arranged in a perpendicular direction with respect to the main plane of the circuit board 20 disposed into the portable information terminal main body and which contact with the respective connection terminals of the attached IC card 10 which are arranged in a same way.

In FIG. 25, reference numeral 31a, 31b each denotes a switch member which is disposed in a concave portion formed in a base portion of the U-shaped wall of the connectors 29. The switch members 31a, 31b constitute a detection switch. When the IC card 10 is loaded in the connector 29 as shown in FIG. 25, the switch member 31a is in contact with the switch member 31b. On the other hand, when the IC card 10 is removed from the connector 29 as shown in FIG. 26, the switch member 31a is separated from the switch member 31b.

Next, the operation of the portable information terminal will be described below.

Firstly, when the portable information terminal is used, the flip cover 8 is opened. An IC card 10 is inserted downwardly from the insertion mouth provided in the connector 29 and the IC card 10 is loaded in the connector 29. In this state, the connection terminals of the IC card 10 are in contact with the respective connection terminals of the connector 29. At this time, the switch member 31a is pressed by the IC card 10 and contact is made with the switch member 31b. Thus, power is put in the ON position. As shown in FIG. 25, the IC card 10 is formed in a rectangular shape, an upper part of the IC card 10 protrudes outwardly from the connector 29. After the completion of loading the IC card 10 into the connector 29, the flip cover 8 is closed.

When the use of the portable information terminal is completed and the IC card is removed, the flip cover 8 is opened, and thereafter, the IC card 10 is drawn upwardly by grasping the protruding part of the IC card. At this time, the switch member 31a is separated from the switch member 31b by its resilient force. Thus, before the contact of the connection terminals of the IC card 10 with those of the connector 29 is released, the IC card 10 is disconnected from the power source. After the IC card 10 is removed, the flip cover 8 is closed.

As described above, according to the sixth embodiment, since the connector 29 is formed to define a groove which extends in a perpendicular direction with respect to the main plane of the circuit board disposed into the portable information terminal main body, it is possible to reduce the occupied area of the circuit board by the connector or the connector-related elements.

Since the groove of the connector 29 has a height less than that of the IC card 10, the upper part of the IC card 10 loaded in the connector 29 protrudes outwardly from the connector 29. Thus, after the flip cover 8 is opened, it is possible to easily remove the IC card 10 by grasping and withdrawing the protruding part of the IC card with the thumb and forefinger. Therefore, it is possible to simplify the structure of a connector without requirement of a complicated mechanism.

Further, a first switch member 31a and a second switch member 31b are provided which comprise a detection switch for detecting the presence of an IC card 10 in the connector 29. Thus, the IC card 10 is always disconnected from the power source when the contact of the connection terminals of the IC card 10 with the respective connection terminals of the connector 29 is initiated and when the contact of the connection terminals of the IC card 10 with the respective connection terminals of the connector 29 is released. As a result, it is possible to prevent damage to the circuit elements even when the IC card is inadvertently attached to or detached from the connector 29.

Furthermore, since the connector 29 is disposed on a front surface of the front case 1 of which the flip cover 8 is opened, it is possible to attach the IC card 10 to the connector 29 by simply and solely opening the flip cover 8 and thus the attaching operation of the IC card can be facilitated.

In the portable information terminal according to the third, fourth, fifth and sixth embodiments, the, connection terminals may be disposed on both side walls of the connector in the same way as that of the second embodiment.

The portable information terminal according to the first, second, third and fifth embodiments may be provided with a switch member which comprises a detection switch for detecting the presence of the IC card in the connector in the same way as that of the fourth embodiment.

As described above, the portable information terminal according to the present invention is adapted to reduce the size and costs of a portable information terminal such as a portable telephone which is used in combination with an IC card in which individual identification information is stored.

What is claimed is:

1. A portable information terminal used with an information card, comprising:

a housing forming a portable information terminal main body;

a circuit board provided in the housing;

a connector having a plurality of connection terminals which are connected to the circuit board, said connector being formed to define a groove provided in said housing for storing the information card;

said plurality of connection terminals being arranged on a first lateral wall of the connector in such a manner that the connection terminals contact with a plurality of connection terminals provided in a main plane of the information card; and said first lateral wall being inclined with respect to a main plane of the circuit board; wherein said main place of said circuit board is a surface of said circuit board on which a majority of circuit elements of said circuit board are mounted, said main plane of said information card is largest dimension surface of said information card, and said first lateral wall is a wall that is conextensive with said man plane of said information card.

2. The portable information terminal according to claim 1, wherein said plurality of connection terminals of the connector, which are connected with the plurality of connection terminals provided in the information card, are arranged on a second lateral wall of the connector which stores the information card in addition to said first lateral wall.

3. The portable information terminal according to claim 1, wherein said groove has an insertion mouth formed on a surface of the housing, a length of which is greater than or equal to a width of the information card, and said groove has a height less than a height of the information card.

4. The portable information terminal according to claim 1, wherein said groove includes an insertion section having an insertion mouth formed on a surface of the housing and a mounting section having a guide mouth surrounded by a U-shaped wall portion, the insertion mouth having a length greater than or equal to a width of the information card, the guide mouth having a length greater than or equal to a height of the information card, and the mounting section being in communications with the insertion section at the guide mouth.

5. The portable information terminal according to claim 4, wherein said insertion section has a height less than the height of the information card, and said mounting section has a depth of a length less than the width of the information card.

6. The portable information terminal according to claim 3, wherein said insertion mouth is formed along a longitudinal direction or a lateral direction of the portable information terminal main body.

7. The portable information terminal according to claim 4, wherein said insertion mouth is formed along a longitudinal direction or a lateral direction of the portable information terminal main body.

8. The portable information terminal according to claim 1, comprising a battery pack which is attached to the housing to cover the information card stored in the groove.

9. The portable information terminal according to claim 1, comprising a cover which is attached to open and close freely with respect to the housing, said cover being adapted to cover the connector when the cover is closed.

10. The portable information terminal according to claim 1, comprising a detection switch for detecting the presence of the information card, said detection switch including a first switching member and a second switching member which are disposed in the groove, the first switching member being in contact with the second switching member when the information card is stored in a loading position, and the first and second switching members being separated from each other when the information card is displaced from the loading position.

* * * * *

UNITED STATES PATENT AND TRADEMARK OFFICE
CERTIFICATE OF CORRECTION

PATENT NO.    : 6,543,696 B2
DATED         : April 8, 2003
INVENTOR(S)   : Hiroyuki Nishimura It is certified that error appears in the above-identified patent and that said Letters Patent is hereby corrected as shown below:

<u>Title page,</u>
Item [*] Notice, should be:

-- [*] Notice:  Subject to any disclaimer, the term of this patent is extended or adjusted under 35 U.S.C. 154(b) 102 days. --

Signed and Sealed this

Tenth Day of February, 2004

JON W. DUDAS
*Acting Director of the United States Patent and Trademark Office*